US 6,643,011 B2

(12) United States Patent
Kojima (10) Patent No.: US 6,643,011 B2
(45) Date of Patent: Nov. 4, 2003

(54) SNR CALCULATION METHOD AND OPTICAL SPECTRUM MEASUREMENT APPARATUS

(75) Inventor: Manabu Kojima, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 0 days.

(21) Appl. No.: 10/080,820

(22) Filed: Feb. 21, 2002

(65) Prior Publication Data
US 2002/0113962 A1 Aug. 22, 2002

(30) Foreign Application Priority Data
Feb. 21, 2001 (JP) .................... P. 2001-044541

(51) Int. Cl.$^7$ .................................................. G01J 3/00
(52) U.S. Cl. .................... 356/300; 356/307; 356/328; 356/334
(58) Field of Search .................... 356/326, 328, 356/307, 300; 359/110

(56) References Cited
U.S. PATENT DOCUMENTS
5,796,479 A * 8/1998 Derickson et al. .......... 356/326
5,969,834 A * 10/1999 Farber et al. ............... 359/110
5,986,782 A * 11/1999 Alexander et al. .......... 359/110
6,268,943 B1 * 7/2001 Kang .......................... 359/110

* cited by examiner

Primary Examiner—F. L. Evans
(74) Attorney, Agent, or Firm—Fish & Richardson P.C.

(57) ABSTRACT

An SNR calculation method having the steps of measuring the wavelength characteristic of a dynamic range in an optical spectrum measurement apparatus for each wavelength in a multiplexed wavelength range and storing the wavelength characteristic in a storage unit, measuring the signal level and the noise level of a measured optical signal wavelength, reading the noise level of the wavelength of the measured optical signal produced by each of other optical signal wavelengths multiplexed on the measured optical signal wavelength from the storage unit, subtracting the noise level read from the storage unit from the noise level of the measured optical signal wavelength to provide the corrected noise level, and calculating the SNR of the measured optical signal from the measured optical signal level and the corrected noise level.

7 Claims, 6 Drawing Sheets

SNR CALCULATION METHOD AND OPTICAL SPECTRUM MEASUREMENT APPARATUS

BACKGROUND OF THE INVENTION

1. Field of the Invention

This invention relates to an SNR (signal-to-noise ratio) calculation method used with an optical spectrum measurement apparatus for measuring the optical spectrum characteristic of a light source.

2. Description of the Related Art

Figure 1:
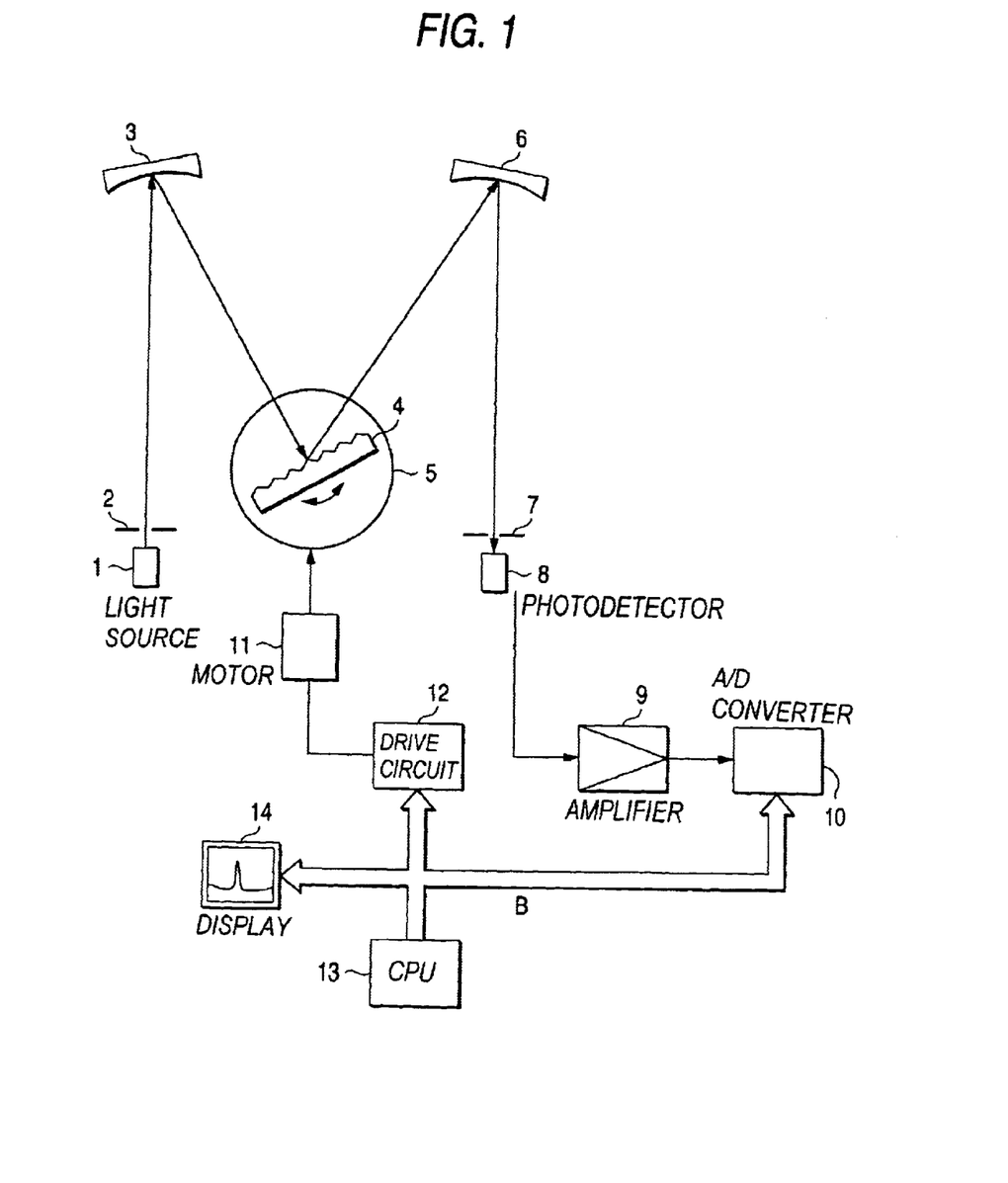
FIG. 1 is a block diagram to show the configuration of an optical spectrum measurement apparatus in a related art.

FIG. 1 is a drawing to show the configuration of an optical spectrum measurement apparatus in a related art.

In FIG. 1, numeral 1 denotes a light source containing various wavelength components for emitting light on which spectrum measurement is to be conducted.

Numeral 2 denotes an incidence slit for limiting the intensity of light emitted from the light source 1.

Numeral 3 denotes a concave mirror for converting light incident thereon through the incidence slit 2 into collimated light.

Numeral 4 denotes a diffraction grating being formed on a surface with a large number of grooves for spatially separating the collimated light provided by the concave mirror 3 for each wavelength.

The diffraction grating 4 is placed on a rotation stage 5 and rotates with rotation of the rotation stage 5.

Numeral 6 denotes a concave mirror for forming only the light of the spatially separated light by the diffraction grating, incident on the concave mirror 6 at a slit position of an emission slit 7.

Numeral 7 denotes the just-mentioned emission slit for limiting the wavelength range of the light formed at the slit position by the concave mirror 6.

The incidence slit 2, the concave mirror 3, the diffraction grating 4, the concave mirror 6, and the emission slit 7 make up a monochromator called Zerni Turner type dispersion monochromator.

Numeral 8 denotes a photodetector such as a photodiode for converting the intensity of the light emitted through the emission slit 7 into an electric signal.

Numeral 9 denotes an amplifier for amplifying the electric signal output from the photodetector 8.

Numeral 10 denotes an analog-digital converter (A/D converter) for converting the electric signal amplified by the amplifier 9 into a digital signal.

Numeral 11 denotes a motor for rotating the rotation stage 5 on which the diffraction grating 4 is placed; the motor 11 rotates the rotation stage 5 and the diffraction grating 4.

Numeral 12 denotes a drive circuit for controlling the turning operation of the motor 11 in response to a control signal output from a CPU 13 described later.

Numeral 14 denotes a display, such as a CRT (cathode-ray tube) display or a liquid crystal display.

The CPU 13, which is connected to the A/D converter 10, the drive circuit 12, and the display 14 by a bus B, outputs the control signal for controlling the drive circuit 12 and performs arithmetic processing on the digital signal output from the A/D converter 10 and then displays a spectrum distribution, for example, on the display 14.

In the described configuration, when light is emitted from the light source 1, the emitted light is incident on the incidence slit 2.

The light passed through the incidence slit 2 is converted into collimated light by the concave mirror 3 and the collimated light is incident on the diffraction grating 4.

The diffraction grating 4 is rotated on the axis parallel to a large number of grooves formed on the surface by the motor 11, forming an arbitrary angle with the collimated light.

This arbitrary angle is determined by the drive circuit 12 which controls the motor 11 in response to the control signal output from the CPU 13.

The diffraction grating 4 spatially separates the incident collimated light for each wavelength. Only the light of the wavelength determined by the angle between the collimated light and the diffraction grating 4, etc., of the wavelengths provided by spatially separating the light through the diffraction grating 4 is emitted to the concave mirror 6.

The concave mirror 6 allows only the incident light of the wavelength to be formed at the slit position of the emission slit 7.

Only the wavelength component within the range of the slit width of the emission slit 7 is allowed to pass through the emission slit 7.

The photodetector 8 receives the light passed through the emission slit 7 and converts the light into an electric signal proportional to the intensity of the passed-through light.

The amplifier 9 amplifies the output of the photodetector 8 to a voltage appropriate for input of the A/D converter 10.

The A/D converter 10 converts the output of the amplifier 9 into a digital signal. The digital signal output by the A/D converter 10 is input to the CPU 13, which then performs arithmetic processing on the digital signal.

The CPU 13 outputs the result of the arithmetic processing (for example, a spectrum distribution) to the display 14 via the bus B.

The display 14 displays the display contents responsive to the arithmetic result output by the CPU 13.

Next, the measurement procedure will be discussed.

To begin with, the CPU 13 commands the drive circuit 12 to vary the angle of the diffraction grating 4, thereby setting the wavelength passing through the emission slit 7 and inputs the intensity of the light passed through the emission slit 7 from the output of the A/D converter 10.

The CPU 13 outputs a control signal to the drive circuit 12 to sweep the wavelength passing through the emission slit 7 from the measurement start wavelength to the measurement end wavelength, and displays the measurement wavelength vs light intensity characteristic repeatedly provided on the display 14 as an optical spectrum.

Figure 2:
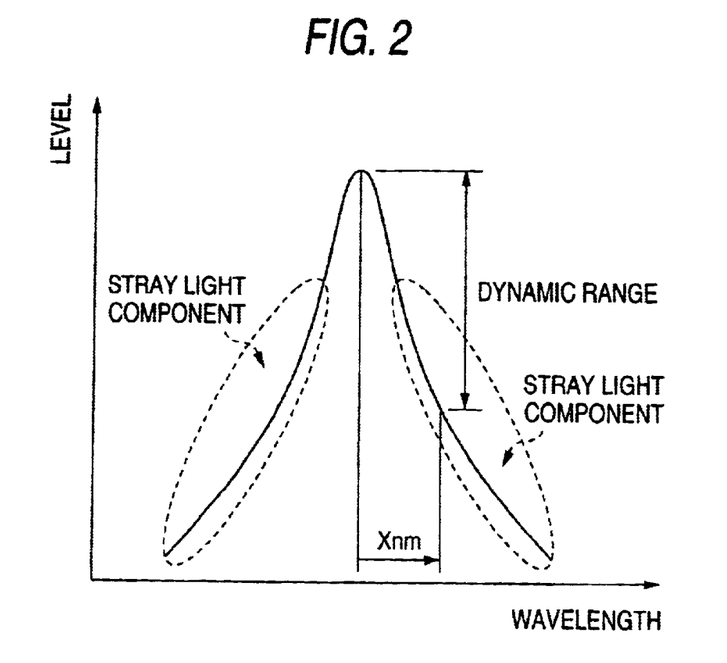
FIG. 2 is a drawing to show an optical spectrum measurement example of the optical spectrum measurement apparatus.

When the optical spectrum measurement apparatus shown in FIG. 1 measures the light source having a signal of only a single wavelength component, a spectrum as shown in FIG. 2 is provided.

In the spectrum shown in FIG. 2, the amount representing the degree of skirting of the waveform of both side portions of the signal wavelength is called dynamic range of the optical spectrum measurement apparatus and is represented as the ratio between the light intensity at the signal wavelength and the light intensity at a distance of X nm from the signal wavelength.

In the optical spectrum measurement apparatus, the skirting of the waveform is caused to occur by the stray light components produced by the optical parts, etc., in the monochromator, and the value of the dynamic range is used as an important reference to determine the performance of the optical spectrum measurement apparatus.

Figure 3:
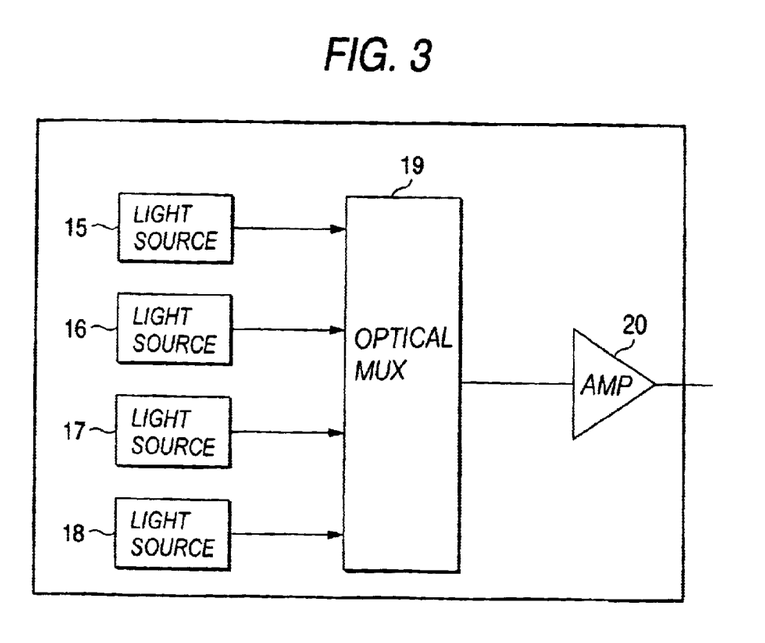
FIG. 3 is a drawing to show the configuration of a wavelength multiplex signal light source.

As the light source on which spectrum measurement is to be conducted, a light source having the configuration shown in FIG. 3 is possible. In FIG. 3, numerals 15 to 18 denote light sources different in signal wavelength.

Numeral 19 denotes an optical multiplexer for multiplexing light of the light source 15 to light of the light source 18 different in signal wavelength into one optical fiber.

Numeral 20 denotes an optical fiber amplifier for amplifying and outputting an input optical signal.

The system of transmitting information using the light source as shown in FIG. 3 is called wavelength division multiplexing transmission, on which attention is focused as a next-generation information transmission system.

Figure 4:
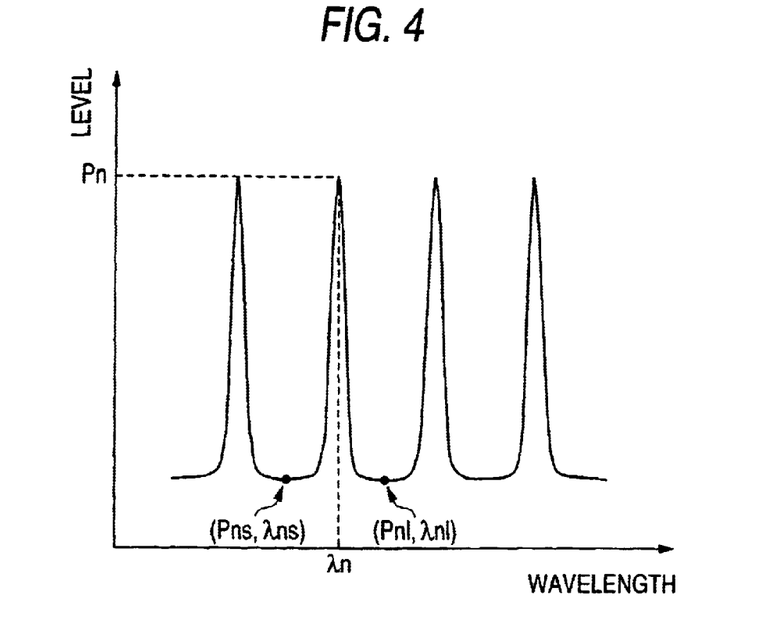
FIG. 4 is a drawing to show an optical spectrum measurement example of measuring the light source in FIG. 3 by the optical spectrum measurement apparatus.

When the output light in FIG. 3 is measured by the optical spectrum measurement apparatus, a spectrum as shown in FIG. 4 is provided and various signal analyses are performed.

Among them, an analysis of an SNR (signal-to-noise ratio) represented as the ratio between the optical signal level and the noise level is one of the important analysis items to maintain the transmission quality on a transmission line.

Here, the SNR analysis method will be discussed using the spectrum in FIG. 4.

The SNR is measured as the ratio between an optical signal optical level Pn and a noise level Nn.

As for the spectrum as shown in FIG. 4, generally the noise level Nn is calculated using the level between signal wavelengths as follows:

$$Nn = Pns + (Pnl - Pns)(\lambda n \lambda ns)/(\lambda nl - \lambda ns)(dBm) \quad (1)$$

Therefore, the SNR is $$SNRn = Pn - Nn (dB) \quad (2)$$

Figure 5:
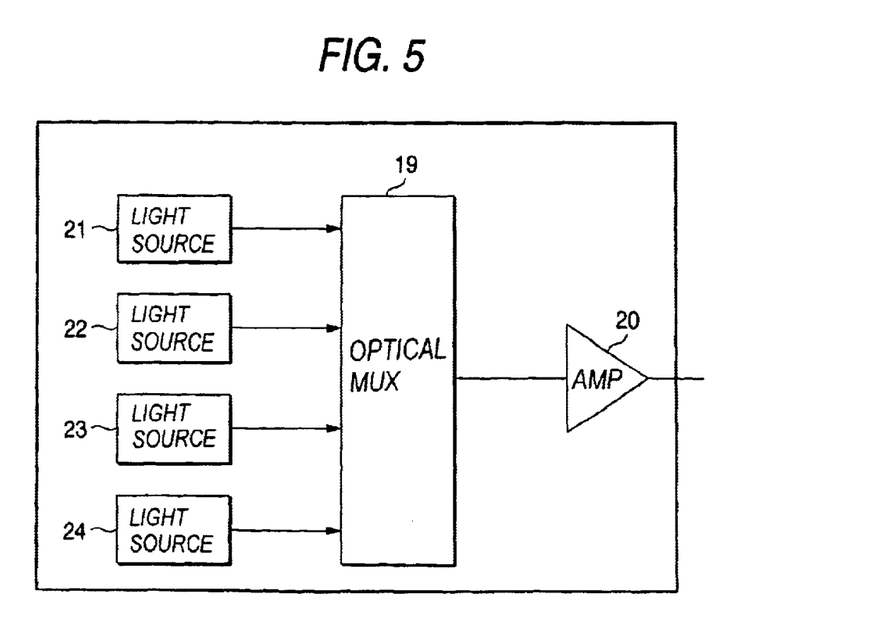
FIG. 5 is a drawing to show the configuration of a wavelength multiplex signal light source.

In FIG. 5, the light sources 15 to 18 different in signal wavelength making up the light source in FIG. 3 are replaced with light sources 21 to 24 with narrowed spacing between adjacent signal wavelengths.

The system of transmitting information using the light source as shown in FIG. 5 is called dense wavelength division multiplexing transmission, which can transmit a larger-capacity information than the wavelength division multiplexing transmission, and research and development of the dense wavelength division multiplexing transmission is conducted heavily.

Figure 6:
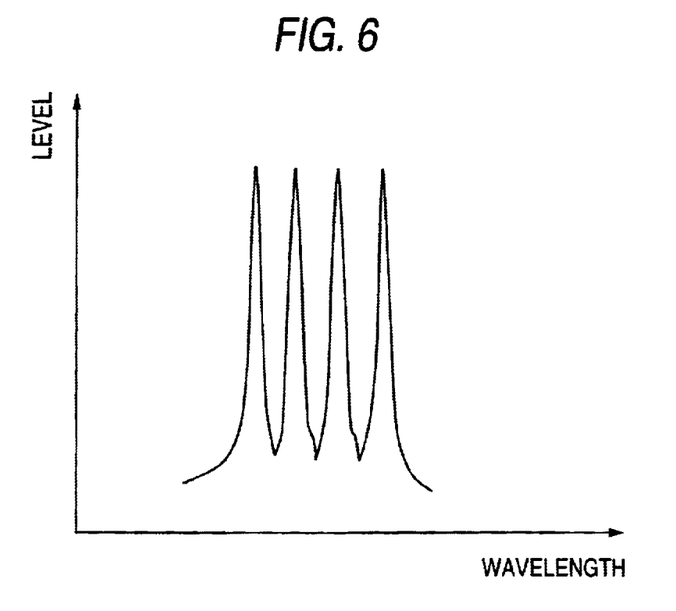
FIG. 6 is a drawing to show an optical spectrum measurement example of measuring the light source in FIG. 5 by the optical spectrum measurement apparatus.

When the output light in FIG. 5 is measured by the optical spectrum measurement apparatus, a spectrum as shown in FIG. 6 is provided.

To measure the SNR as with a similar method to the above-described method, the spectrum in FIG. 6 is a characteristic that the level between signal wavelengths lifts up and is measured as if the noise level rose.

This is a phenomenon caused to occur because the stray light component produced by the optical parts, etc., in the monochromator of the optical spectrum measurement apparatus overlaps the actual signal noise component.

Figure 7:
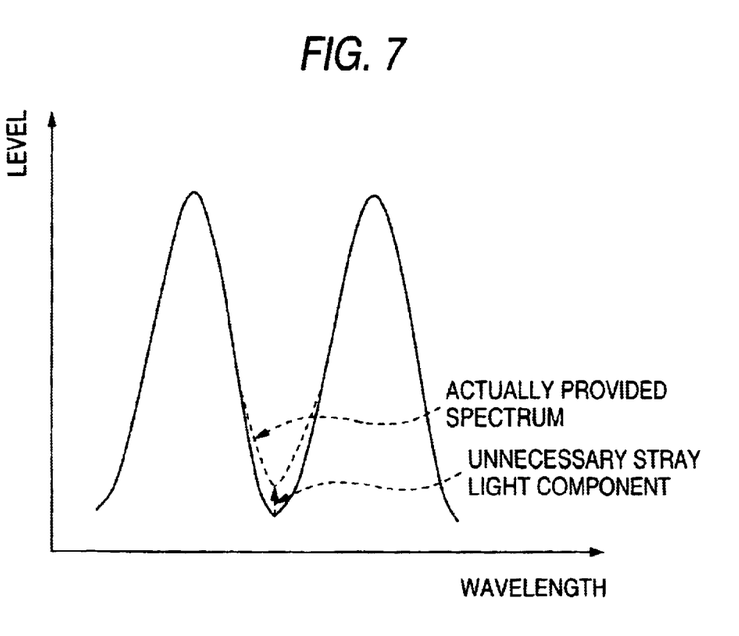
FIG. 7 is a drawing to describe an unnecessary stray light component.

This point will be discussed in detail using an optical spectrum shown in FIG. 7.

When two signals different in wavelength combined into one optical fiber are measured by the optical spectrum measurement apparatus, a spectrum produced by combining spectra provided by measuring the two signals separately is provided.

At the time, between the two signals, the skirting levels of both the signals are combined and a spectrum as indicated by the dotted line in the figure is provided.

Normally, as the skirting level of the optical spectrum measurement apparatus is away from the signal wavelength, it becomes smaller accordingly, and thus no problem arises when the spacing between the two signal light wavelengths is wide.

However, if the optical spectrum measurement apparatus is used to measure the SNR in the light source made up of the light sources with narrowed spacing between adjacent signal wavelengths as shown in FIG. 5, the problem as mentioned above occurs.

A similar problem also occurs if an optical spectrum measurement apparatus having a bad dynamic range, in other words, an optical spectrum measurement apparatus having large stray light components produced by the optical parts, etc., in the monochromator is used to measure the SNR.

In the related art, the SNR is calculated from the measured optical spectrum intact and therefore the above-mentioned problem cannot be solved.

SUMMARY OF THE INVENTION

It is therefore an object of the invention to provide a method of measuring an SNR more accurately even if an optical spectrum measurement apparatus is used to measure the SNR in a light source made up of light sources with narrowed spacing between adjacent signal wavelengths as shown in FIG. 5 or if an optical spectrum measurement apparatus having a bad dynamic range is used to measure the SNR.

To solve the above-described problem, according to the invention, there is provided a method including the steps of:

measuring the wavelength characteristic of a dynamic range (degree of skirting) in an optical spectrum measurement apparatus for each wavelength in a multiplexed wavelength range and storing the wavelength characteristic in a storage unit;

measuring the signal level and the noise level of a measured optical signal wavelength;

reading the noise level of the wavelength of the measured optical signal produced by each of other optical signal wavelengths multiplexed on the measured optical signal wavelength from the storage unit;

subtracting the noise level read from the storage unit from the noise level of the measured optical signal wavelength to provide the corrected noise level; and calculating the SNR of the measured optical signal from the measured optical signal level and the corrected noise level are executed for calculating the SNR, so that the SNR can also be measured more accurately if an optical spectrum measurement apparatus is used to measure the SNR in a light source made up of light sources with narrowed spacing between adjacent signal wavelengths or if an optical spectrum measurement apparatus having a bad dynamic range is used to measure the SNR.

As the wavelength characteristic of the dynamic range stored in the storage unit, for each of a plurality of signal wavelengths, the noise level of each wavelength shifted in steps of a predetermined wavelength (for example, ±0.1 nm, ±0.2 nm, ±0.3 nm, ±0.4 nm, ...) from the signal wavelength can be stored together with each signal level.

Since the wavelength characteristic of the dynamic range varies for each monochromator, as the wavelength characteristic of the dynamic range stored in the storage unit, for each monochromator, the noise level of each wavelength shifted in steps of a predetermined wavelength from the signal wavelength may be stored together with each signal level.

When the noise level of the wavelength of the measured optical signal produced by each of other optical signal wavelengths is read from the storage unit, if the data of other optical signal wavelengths is not stored in the storage unit, the dynamic range characteristic of the closest wavelength is selected, so that the capacity of the data stored in the storage unit can be lessened.

If the dynamic range characteristic of the closest wavelength is selected from the storage unit, in response to the difference between a different signal wavelength and the selected wavelength, interpolation operation (for example, linear interpolation) is performed on the noise level of the different signal wavelength, if the capacity of the data stored in the storage unit is lessened, measurement with high reliability is made possible.

If an optical spectrum measurement apparatus has a storage unit storing the wavelength characteristic of a dynamic range resulting from measuring the noise levels at the wavelengths shifted in steps of a predetermined wavelength from each wavelength for each of a large number of wavelengths in the multiplexed optical signal wavelength range, the SNR can also be measured more accurately if the optical spectrum measurement apparatus is used to measure the SNR in the light source made up of light sources with narrowed spacing between adjacent signal wavelengths or if the optical spectrum measurement apparatus having a bad dynamic range is used to measure the SNR.

The dynamic range characteristic is stored for each monochromator, so that it is made possible for the optical spectrum measurement apparatus to conduct measurement with higher accuracy.

DETAILED DESCRIPTION OF THE PRESENT INVENTION

Referring now to the accompanying drawings, an SNR calculation method according to an embodiment of the invention will be discussed.

Figure 8:
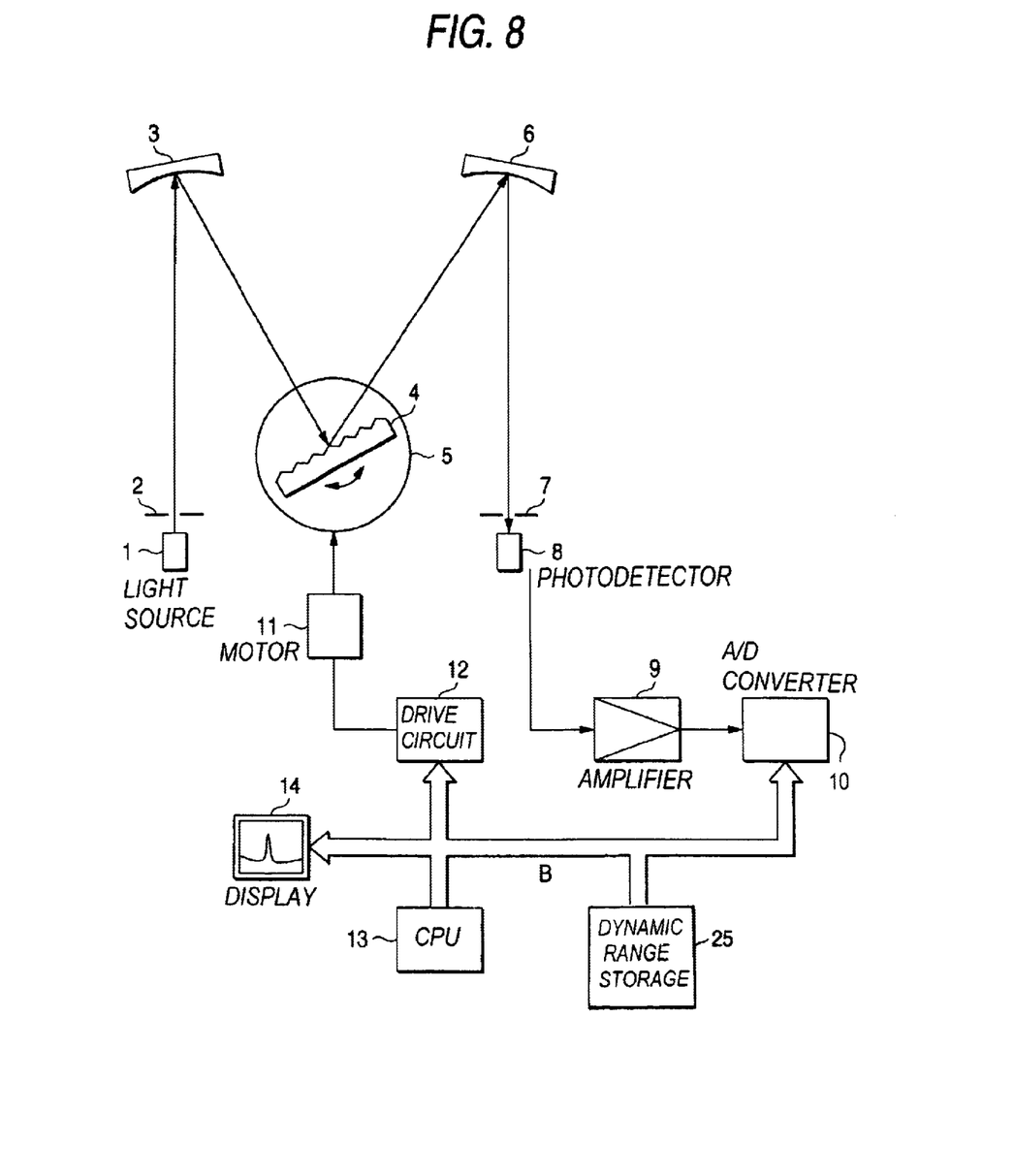
FIG. 8 is a block diagram to show the configuration of an optical spectrum measurement apparatus according to the invention.

FIG. 8 is a drawing to show the configuration of an optical spectrum measurement apparatus to which the SNR calculation method of the invention is applied.

The optical spectrum measurement apparatus shown in FIG. 8 differs from the optical spectrum measurement apparatus in the related art shown in FIG. 1 in that a dynamic range storage section 25 is connected to a bus B.

In the configuration, to measure an optical spectrum, as in the related art, light emitted from a light source 1 passes through an incidence slit 2 and is converted into collimated light by a concave mirror 3 and the collimated light is output to a diffraction grating 4.

The incident light is spatially separated. Only the light of the wavelength determined by the angle between the incident light and the diffraction grating 4, etc., is diffracted in the direction of a concave mirror 6 and is formed at a slit of an emission slit 7 by the concave mirror 6.

Only the wavelength component determined by the slit width of the emission slit 7 passes through the emission slit 7 and is incident on a photodetector 8.

The incident light is converted into an electric signal proportional to the light intensity by the photodetector 8 and the light output by the photodetector 8 is amplified by an amplifier 9 to a voltage appropriate for input of an A/D converter 10.

The electric signal amplified by the amplifier 9 is converted into a digital signal by the A/D converter 10.

The provided digital signal is input to a CPU 13, which then performs arithmetic processing on the digital signal.

Upon completion of light intensity measurement on the light of one wavelength, the CPU 13 outputs a control signal to a drive circuit 12 to turn a motor 11 for changing the angle between the light emitted from the concave mirror 3 and the diffraction grating 4.

When the angle is changed, the wavelength of the light emitted through the emission slit 7 is changed, for example, 0.01 nm.

After outputting the control signal, the CPU 13 performs arithmetic processing on the input digital signal in a similar manner to the operation described above.

Thus, the CPU 13 measures the wavelength range of 1540 nm to 1550 nm in 0.01-nm steps, for example, and performs arithmetic processing to find the light intensity of each wavelength.

An example of an optical spectrum thus provided is shown in FIG. 2.

The measured optical signals are wavelength multiplex signal sources wherein the signal wavelengths of the light sources 21 to 24 in FIG. 5 are spaced 0.4 nm from each other, namely, are 1546.92 nm, 1547.32 nm, 1547.72 nm, and 1548.12 nm.

The SNR calculation method according to the invention will be discussed in detail.

The dynamic range storage section 25 in FIG. 8 which shows the configuration of the optical spectrum measurement apparatus stores the characteristic of the dynamic range at points at a distance of ±X nm from the center wavelength of the measured signal light.

For example, the values of the dynamic ranges measured using light source wherein the center wavelength can be arbitrarily set between 1500 nm and 1600 nm as the measured signal light are stored with respect to the measured signal wavelengths.

For example, the values of the dynamic ranges at points ±0.1 nm, ±0.2 nm, ±0.3 nm, ±0.4 nm, and ±0.5 nm away from the center wavelength of the measured signal light are stored.

As the values, the values found by actual measurement or calculation are previously stored.

Figure 9:
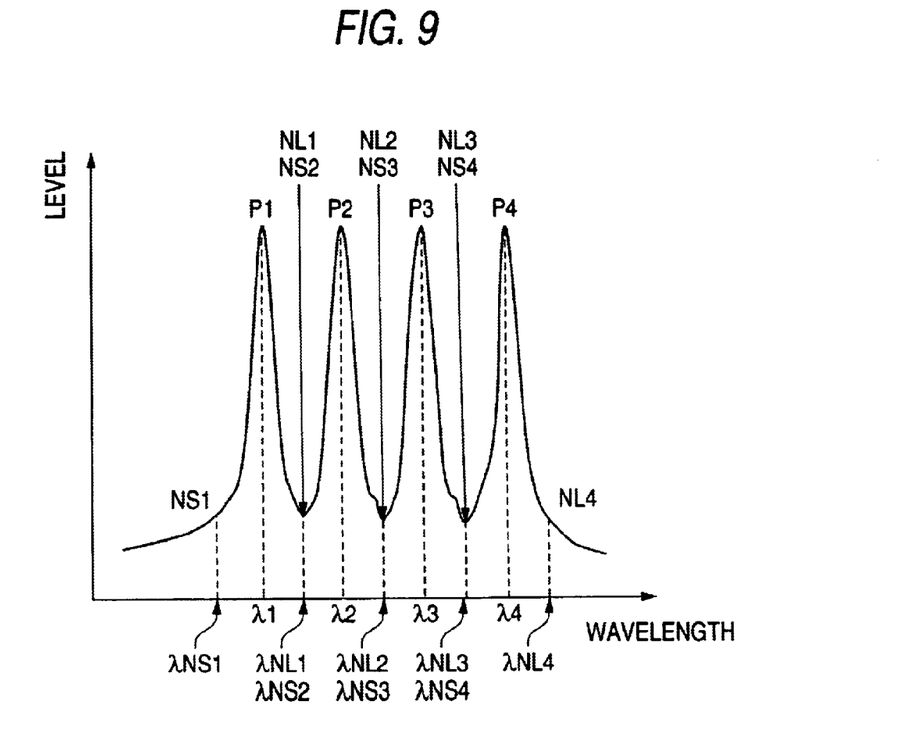
FIG. 9 is a drawing to describe an SNR calculation method.

To begin with, an optical spectrum is measured by the optical spectrum measurement apparatus. The provided spectrum is as shown in FIG. 9.

As described above, the SNR is measured as the ratio between the optical signal level and the noise level.

The noise level is found from the level between signals, but the level between signals is a value containing the stray light component produced by any other signal than the measured signal.

The invention is characterized by the fact that from the noise level found by measurement, the value of the stray light component produced by any other signal at the measurement point of the noise level is subtracted.

Accordingly, the more accurate noise level can be found and consequently, the more accurate SNR can be measured.

A method of calculating the value of the stray light component produced by any other signal with respect to the noise level of any desired signal will be discussed.

The following values are found from the measured spectrum shown in FIG. 9:

To begin with, signal light levels P1, P2, P3, and P4 and wavelengths $\lambda 1$, $\lambda 2$, $\lambda 3$, and $\lambda 4$ corresponding to the signal light levels are read.

Next, signal-to-signal levels NS1, NL1, NS2, NL2, NS3, NL3, NS4, NL4 and the wavelengths $\lambda$SN1, $\lambda$NL1, $\lambda$NS2, $\lambda$NL2, $\lambda$NS3, $\lambda$NL3, $\lambda$NS4, $\lambda$NL4 corresponding to the signal-to-signal levels are read.

A description is given by taking an example. The level NS2 at the point of the wavelength $\lambda$NS2 should be the value of the sum of the stray light components produced by the signal light ($\lambda 1$, P1), the signal light ($\lambda 2$, P2), and the signal light ($\lambda 3$, P3).

The stray light component produced at the point of $\lambda$NS2 by the signal light ($\lambda 1$, P1) can be found from the value of the dynamic range at the position at a distance of ($\lambda$NS2-$\lambda 1$) nm from $\lambda 1$. The measured signal wavelengths stored in the dynamic range storage section 25 are referenced and the dynamic range characteristic closest to $\lambda 1$ is selected.

Dynamic range value PD12S at the position at the distance of ($\lambda$NS2-$\lambda 1$) nm is found from the selected dynamic range characteristic. Thus, stray light component S12S produced at the noise measurement point ($\lambda$NS2, NS2) by the signal light ($\lambda 1$, P1) is:

$$S12S = P1 - PD12S(dBm) \quad (3)$$

Likewise, the stray light component produced by the signal light ($\lambda 3$, P3) can be found from the value of the dynamic range at the position at a distance of ($\lambda$NS2-$\lambda 3$) nm from $\lambda 3$.

The measured signal wavelengths stored in the dynamic range storage section 25 are referenced and the dynamic range characteristic closest to $\lambda 3$ is selected.

Dynamic range value PD32S at the position at the distance of ($\lambda$NS2-$\lambda 3$) nm is found from the selected dynamic range characteristic.

Thus, stray light component S32S produced at the noise measurement point ($\lambda$NS2, NS2) by the signal light ($\lambda 3$, P3) is $$S32S = P3 - PD32S(dBm) \quad (4)$$

Likewise, the stray light component produced by the signal light ($\lambda 4$, P4) can be found from the value of the dynamic range at the position at a distance of ($\lambda$NS2-$\lambda 4$) nm from $\lambda 4$.

The measured signal wavelengths stored in the dynamic range storage section 25 are referenced and the dynamic range characteristic closest to $\lambda 4$ is selected. Dynamic range value PD42S at the position at the distance of ($\lambda$NS2-$\lambda 4$) nm is found from the selected dynamic range characteristic.

Thus, stray light component S42S produced at the noise measurement point ($\lambda$NS2, NS2) by the signal light ($\lambda 4$, P4) is $$S42S = P4 - PD42S(dBm) \quad (5)$$

Thus, noise level NS2' provided by subtracting the unnecessary stray light components at the noise measurement point $\lambda$NS2 is represented by the following expression:

$$NS2' = 10^{NS2/10} - 10^{S12S/10} - 10^{S32S/10} - 10^{S42S/10}(mW) \quad (6)$$

The level NL2 at the point of the wavelength $\lambda$NL2 should be the value of the sum of the stray light components produced by the signal light ($\lambda 1$, P1), the signal light ($\lambda 2$, P2), and the signal light ($\lambda 3$, P3).

The stray light component produced at the point of $\lambda$NL2 by the signal light ($\lambda 1$, P1) can be found from the value of the dynamic range at the position at a distance of ($\lambda$NL2-$\lambda 1$) nm from $\lambda 1$. The measured signal wavelengths stored in the dynamic range storage section 25 are referenced and the dynamic range characteristic closest to $\lambda 1$ is selected.

Dynamic range value PD12L at the position at the distance of ($\lambda$NL2-$\lambda 1$) nm is found from the selected dynamic range characteristic.

Thus, stray light component S12L produced at the noise measurement point ($\lambda$NL2, NL2) by the signal light ($\lambda 1$, P1) is $$S12L = P1 - PD12L(dBm) \quad (7)$$

Likewise, the stray light component produced by the signal light ($\lambda 3$, P3) can be found from the value of the dynamic range at the position at a distance of ($\lambda$NL2-$\lambda 3$) nm from $\lambda 3$.

The measured signal wavelengths stored in the dynamic range storage section 25 are referenced and the dynamic range characteristic closest to $\lambda 3$ is selected.

Dynamic range value PD32L at the position at the distance of ($\lambda$NL2-$\lambda 3$) nm is found from the selected dynamic range characteristic.

Thus, stray light component S32L produced at the noise measurement point ($\lambda$NL2, NL2) by the signal light ($\lambda 3$, P3) is $$S32L = P3 - PD32L(dBm) \quad (8)$$

Likewise, the stray light component produced by the signal light ($\lambda 4$, P4) can be found from the value of the dynamic range at the position at a distance of ($\lambda$NL2-$\lambda 4$) nm from $\lambda 4$.

The measured signal wavelengths stored in the dynamic range storage section 25 are referenced and the dynamic range characteristic closest to $\lambda 4$ is selected.

Dynamic range value PD42L at the position at the distance of ($\lambda$NL2-$\lambda 4$) nm is found from the selected dynamic range characteristic.

Thus, stray light component S42L produced at the noise measurement point ($\lambda$NL2, NL2) by the signal light ($\lambda 4$, P4) is $$S42L = P4 - PD42L(dBm) \quad (9)$$

Thus, noise level NL2' provided by subtracting the unnecessary stray light components at the noise measurement point $\lambda$NL2 is represented by the following expression:

$$NL2'=10^{NL2/10}-10^{S12L/10}-10^{S32L/10}-10^{S42L/10}(mW) \quad (10)$$

The SNR is calculated using the found noise levels NS2' and NL2' provided by subtracting the unnecessary stray light components.

To begin with, the units of NS2' and NL2' are converted into dBm.

$$PNS2'=10\log_{10}(NS2') (dBm) \quad (11)$$

$$PNL2'=10\log_{10}(NL2') (dBm) \quad (12)$$

Here, PNS2' and PNL2' are assigned to expression (1).

$$N2'=PNS2'+(PNL2'-PNS2')(\lambda2-\lambda ns)/(\lambda NL2-XNS2)(dBm) \quad (13)$$

Therefore, SNR2' in the signal light ($\lambda$2, P2) is:

$$SNR2'=P2-N2' (dB) \quad (14)$$

Comparing the found SNR2' value with the value found according to expression (2), the SNR2' value is a value provided by subtracting the unnecessary stray light components by the optical spectrum measurement apparatus and is a more accurate value. SNR1', SNR3', and SNR4' in the signal light ($\lambda$1, P1), the signal light ($\lambda$3, P3), and the signal light ($\lambda$4, P4) can be calculated in a similar manner.

When the value of the dynamic range at the position at a distance of X nm is read from the dynamic range characteristics stored in the dynamic range storage section 25, if the value of the dynamic range corresponding to X nm does not exist, the value is found by a method such as linear interpolation based on the stored dynamic range of the closest wavelength.

If the value of the stray light component produced at the noise measurement point found from expression (3), (4), (5), (7), (8), (9) is equal to or less than the level provided in a state in which the light source 1 of the optical spectrum measurement apparatus is removed and input light is shielded (noise level of the optical spectrum measurement apparatus itself), the found stray light component value need not be subtracted in expression (6) or (10).

The description has been given by taking the case where four signals are multiplexed as an example, but the number of signals to be multiplexed is not limited in the invention.

That is, the more accurate SNR value can be found by calculating all stray light components produced by all signals other than any desired signal.

The description has been given by taking as an example the wavelength multiplex signal source wherein the spacing between the wavelengths of the multiplexed optical signals is narrow. However, even if the spacing between the wavelengths of the multiplexed optical signals is not narrow, if the SNR is measured using an optical spectrum measurement apparatus containing large stray light components, the accurate SNR value cannot be provided.

Even in such a case, the more accurate SNR can be found by the same method as the SNR calculation method described above.

The description has been given by taking the Zerni Turner type monochromator as a monochromator example, but the monochromator is not limited to the configuration of the Zerni Turner type monochromator.

According to the invention, the method includes the steps of:

measuring the wavelength characteristic of a dynamic range (degree of skirting) in an optical spectrum measurement apparatus for each wavelength in a multiplexed wavelength range and storing the wavelength characteristic in a storage unit;

measuring the signal level and the noise level of a measured optical signal wavelength;

reading the noise level of the wavelength of the measured optical signal produced by each of other optical signal wavelengths multiplexed on the measured optical signal wavelength from the storage unit;

subtracting the noise level read from the storage unit from the noise level of the measured optical signal wavelength to provide the corrected noise level; and calculating the SNR of the measured optical signal from the measured optical signal level and the corrected noise level are executed for calculating the SNR, so that the SNR can also be measured more accurately if an optical spectrum measurement apparatus is used to measure the SNR in a light source made up of light sources with narrowed spacing between adjacent signal wavelengths or if an optical spectrum measurement apparatus having a bad dynamic range is used to measure the SNR.

In the invention, as the wavelength characteristic of the dynamic range stored in the storage unit, for each of a plurality of signal wavelengths, the noise level of each wavelength shifted in steps of a predetermined wavelength (for example, ±0.1 nm, ±0.2 nm, ±0.3 nm, ±0.4 nm, . . . ) from the signal wavelength is stored together with each signal level, whereby the noise level of the signal wavelength adjacent to the measured optical signal waveform can be easily read from the storage unit.

In the invention, since the wavelength characteristic of the dynamic range varies for each monochromator, as the wavelength characteristic of the dynamic range stored in the storage unit, for each monochromator, the noise level of each wavelength shifted in steps of a predetermined wavelength from the signal wavelength may be stored together with each signal level.

In the invention, when the noise level of the wavelength of the measured optical signal produced by each of other optical signal wavelengths is read from the storage unit, if the data of other optical signal wavelengths is not stored in the storage unit, the dynamic range characteristic of the closest wavelength is selected, so that the capacity of the data stored in the storage unit can be lessened.

In the invention, if the dynamic range characteristic of the closest wavelength is selected from the storage unit, in response to the difference between a different signal wavelength and the selected wavelength, interpolation operation (for example, linear interpolation) is performed on the noise level of the different signal wavelength, if the capacity of the data stored in the storage unit is lessened, measurement with high reliability is made possible.

In the invention, if an optical spectrum measurement apparatus has a storage unit storing the wavelength characteristic of a dynamic range resulting from measuring the noise levels at the wavelengths shifted in steps of a predetermined wavelength from each wavelength for each of a large number of wavelengths in the multiplexed optical signal wavelength range, the SNR can also be measured more accurately if the optical spectrum measurement apparatus is used to measure the SNR in the light source made up of light sources with narrowed spacing between adjacent signal wavelengths or if the optical spectrum measurement apparatus having a bad dynamic range is used to measure the SNR.

In the invention, the dynamic range characteristic is stored for each monochromator, so that it is made possible for the optical spectrum measurement apparatus to conduct measurement with higher accuracy.

What is claimed is:

1. An SNR palculation method comprising the steps of:

measuring a wavelength characteristic of a dynamic range in an optical spectrum measurement apparatus for each wavelength in a multiplexed wavelength range and storing the wavelength characteristic in a storage unit;

measuring a signal level and a noise level of a measured optical signal wavelength;

reading the noise level of the wavelength of the measured optical signal generated by each of other optical signal wavelengths multiplexed on the measured optical signal wavelength from the storage unit;

subtracting the noise level read from the storage unit from the noise level of the measured optical signal wavelength to provide a corrected noise level; and calculating an SNR of the measured optical signal from the measured optical signal level and the corrected noise level.

2. The SNR calculation method as claimed in claim 1, wherein as the wavelength characteristic of the dynamic range stored in the storage unit, for each of a plurality of signal wavelengths, the noise level of each wavelength shifted in steps of a predetermined wavelength from the signal wavelength is stored together with each signal level.

3. The SNR calculation method as claimed in claim 1, wherein as the wavelength characteristic of the dynamic range stored in the storage unit, for respective monochromators, the noise level of each wavelength shifted in steps of a predetermined wavelength from the signal wavelength is stored together with each signal level.

4. The SNR, calculation method as claimed in claim 1 wherein when the noise level of the wavelength of the measured optical signal produced by each of other optical signal wavelengths is read from the storage unit, if the data of other optical signal wavelengths is not stored in the storage unit, the dynamic range characteristic of the closest wavelength is selected.

5. The SNR calculation method as claimed in claim 4 wherein if the dynamic range characteristic of the closest wavelength is selected from the storage unit, in response to the difference between a different signal wavelength and the selected wavelength, interpolation operation is performed on the noise level of the different signal wavelength.

6. An optical spectrum measurement apparatus comprising:

a storage unit storing the wavelength characteristic of a dynamic range resulting from measuring noise levels at wavelengths shifted in steps of a predetermined wavelength from each wavelength for each of a large number of wavelengths in a multiplexed optical signal wavelength range.

7. The optical spectrum measurement apparatus as claimed in claim 6 wherein the dynamic range characteristic is stored for respective monochromators.

* * * * *